US006966954B2

(12) United States Patent
Rhoads et al.

(10) Patent No.: US 6,966,954 B2
(45) Date of Patent: Nov. 22, 2005

(54) SPALL PROPAGATION PROPERTIES OF CASE-HARDENED M50 AND M50NIL BEARINGS

(75) Inventors: Mark Alan Rhoads, Cincinnati, OH (US); Michael Gilbert Johnson, Fairfield, OH (US); Jonothan Allen Scheetz, Waynesville, OH (US)

(73) Assignee: General Electric Comany, Schenectady, NY (US)

( * ) Notice: Subject to any disclaimer, the term of this patent is extended or adjusted under 35 U.S.C. 154(b) by 190 days.

(21) Appl. No.: 10/279,488

(22) Filed: Oct. 24, 2002

(65) Prior Publication Data

US 2004/0079448 A1 Apr. 29, 2004

(51) Int. Cl.[7] ............... C22C 38/22; C22C 38/44; C21D 9/00; C23C 8/26
(52) U.S. Cl. ............ 148/319; 148/230; 148/231; 148/208
(58) Field of Search ............... 148/318, 230, 148/231, 208

(56) References Cited

U.S. PATENT DOCUMENTS

| | | | | |
|---|---|---|---|---|
| 4,046,601 A | * | 9/1977 | Hook | 148/318 |
| 4,846,899 A | * | 7/1989 | Wilson | 148/232 |
| 4,930,909 A | | 6/1990 | Murakami et al. | |
| 5,165,804 A | | 11/1992 | Fisher et al. | |

(Continued)

FOREIGN PATENT DOCUMENTS

| | | |
|---|---|---|
| DE | 4033701 A1 | 2/1991 |
| EP | 0204818 A2 | 12/1988 |
| EP | 1138795 A1 | 10/2001 |
| JP | 2002364648 | 12/2002 |

OTHER PUBLICATIONS

Hardness Conversion Table, p. 112, ASM Handbook, vol. 8, Mechanical Testing, Jun. 1995.*

Dodd, Andrew et al., "Bearings for Aircraft Gas Turbine Engines (Part 2)" 1999, pp. 1–8, Motion & Control No. 6 NSK.

Dazzani, Michael M. & Pearson, Philip K., "Hybrid Ceramic Bearings for Difficult Applications"April 1998, Journal of Engineering for Turbine & Power –Presented at International Gas Turbine Conference 1995.

Streit, Edgar & Trojahn, Werner, "Duplex Hardening for Aerospace Bearing Steels" May 2001, Bearing Steel Technology, ASTM STP 1419.

*Primary Examiner*—Deborah Yee
(74) *Attorney, Agent, or Firm*—McNees Wallace & Nurick LLC; Carmen Santa Maria; Shawn K. Leppo

(57) ABSTRACT

A roller bearing that provides ball and roller bearing elements comprised of M50 steel and M50NiL steel having surface hardnesses above 60 HRC, and in the range of 65–72 HRC. The hardness in the surface region is achieved by nitriding the surface to achieve a high hardness and extended life. This improvement is brought about by controlling the microstructure of the alloy by minimizing the formation of retained austenite. The material is tempered as required. The surface is then nitrided, but the nitriding operation is carefully controlled to avoid the formation of intergranular nitrides. Because of the method used to prevent the formation of intergranular nitrides, some carbon may be present to prevent the surface of the steel from becoming depleted of carbon. The hardening element in this nitro-carburizing operation is nitrogen, which forms iron nitride as $Fe_3N$ or $Fe_4N$ intragranularly. The purpose of the carbon in the operation is to maintain the concentration of carbon in the surface of the bearing so that the properties are not altered by decarburizing the surface. Standard gaseous and plasma nitriding techniques also may be used for the nitriding operation.

25 Claims, 7 Drawing Sheets

U.S. PATENT DOCUMENTS

| | | | |
|---|---|---|---|
| 5,352,303 A | 10/1994 | Murakami et al. | |
| 5,422,524 A | 6/1995 | Nakamura et al. | |
| 5,560,787 A | 10/1996 | Takagi et al. | |
| 5,593,234 A | 1/1997 | Liston | |
| 5,595,610 A * | 1/1997 | Maeda et al. | 148/233 |
| 5,658,082 A | 8/1997 | Tsushima et al. | |
| 5,700,094 A | 12/1997 | Dam et al. | |
| 5,714,015 A | 2/1998 | Lentz | |
| 5,851,313 A | 12/1998 | Milam | |
| 5,873,056 A | 2/1999 | Tanaka et al. | |
| 5,873,956 A * | 2/1999 | Tanaka et al. | 148/318 |
| 6,095,692 A | 8/2000 | Takemura | |
| 6,171,411 B1 | 1/2001 | Okita et al. | |
| 6,179,933 B1 | 1/2001 | Dodd et al. | |
| 6,224,688 B1 | 5/2001 | Takemura et al. | |
| 6,228,184 B1 | 5/2001 | Tanaka et al. | |
| 6,234,679 B1 | 5/2001 | Sjöstrom | |
| 6,248,186 B1 | 6/2001 | Yamamura et al. | |
| 6,250,812 B1 | 6/2001 | Ueda et al. | |
| 6,358,333 B1 * | 3/2002 | Tanaka et al. | 148/318 |

* cited by examiner

SPALL PROPAGATION PROPERTIES OF CASE-HARDENED M50 AND M50NIL BEARINGS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract N00421-00-R0023S awarded by the Department of Navy.

FIELD OF THE INVENTION

The present invention pertains to ball and roller bearings with improved resistance to spallation, and specifically to ball and roller bearings used at high speeds and heavy loads, such as the ball/roller bearings used in aircraft engines, having limited case depth of nitrogen and controlled nitrogen content within that case depth.

BACKGROUND OF THE INVENTION

Rolling bearings typically include a spacer means, usually called a cage, separator or retainer, which serves to space the rolling elements from each other uniformly around the periphery of the races. For some bearings designed to operate at high values of DN, the cage is guided by having it operate in close proximity to land or shoulder regions on either the inner race or the outer race. There is a close radial clearance, on the order of 0.010 inch, between the cage and the land regions of the guiding race. This design keeps the cage more nearly coaxial with the bearing, which improves the uniformity of spacing of the rolling elements, and also reduces vibration or wobbling of the cage. The bearing races are typically made of steel. Various developments have been undertaken to the bearing races or the roller elements to increase the life of the roller bearings.

A well-known steel used for bearing applications in aircraft engine steels is M50 and its low carbon, high nickel variation M50NiL. The limits of this material have been identified in U.S. Pat. No. 5,560,787 to Takagi. The problem with M50 is that is has low toughness since the material is through hardened. M50NiL, while an improvement, has been identified as having insufficient hot hardness, although it does provide improved core toughness and surface compressive stress region.

Among the developments include the application of hard, wear-resistant coatings, such as, for example, titanium nitride as set forth in U.S. Pat. No. 5,165,804 to Fisher et al., assigned to the assignee of the present invention and incorporated herein by reference. Other additive coatings that have been utilized include coating layers of various wear resistant materials, for example, alternating layers of TiN and NbN. such as set forth in U.S. Pat. No. 5,593,234 to Liston. One of the problems with coatings, even thin, wear resistant coatings such as titanium nitride, such as applied to M50 bearings, is that there is a tendency for such coatings to spall off as the bearing wears. Of course, there is a tendency for the spalling to increase as the coating layer is increased. This spallation occurs over a shorter period of time as the loads are raised and the rotating speeds are increased.

Other developments have included new materials for use in roller bearings. These new materials have been identified as having superior properties over the widely applied M50 and M50NiL steels typically used in aircraft applications. One such steel is identified in U.S. Pat. No. 5,560,787 to Takagi et al., which is touted as superior in toughness and hardness as compared to the M50 steels. This steel also can be carburized or carbonitrided to extend its service life at 400° F. and at high speeds. Another specially developed steel is disclosed in U.S. Pat. No. 4,930,909 to Murakami et al. This medium carbon steel is carburized or carbonitrided to include a case of retained austenite.

Still other efforts have been made to case-harden widely used bearing steels such as M50 and M50NiL. One such effort is set forth in U.S. Pat. No. 5,352,303 to Murakami et al. which carbonitrides the surface of a roller bearing to achieve a ratio of carbon and nitrogen at the surface within well-defined parameters. More recently, case-hardening has included dispersing TiN and TiCN particles within the roller bearing to improve the abrasion resistance. The material is then carbonitrided or carburized at temperatures above 1800° F. In U.S. Pat. No. 6,171,411 B1 to Okita et al., an alloy steel is carburized or carbonitrided to produce a surface with good wear resistance. The basic problem with the carbonitriding treatments is that such treatments tend to oversaturate the surface of the material, which typically includes the critical bearing surfaces. This oversaturation undesirably produces intergranular nitrides. As bearings which include the formation of such intergranular nitrides wear, they tend to spall, sometimes quickly What is desired is a method that increases the Rockwell hardness (HRC) of M50 and M50NiL steels above current hardness values, alters the microstructure, provides surface compressive stresses and minimizes intergranular nitrides to enable such steels to be effectively used as bearing materials for extended times at high temperatures, high loads and high speeds without being subjected to rapid spallation.

SUMMARY OF THE INVENTION

The present invention is a roller bearing that provides ball and roller bearing elements comprised of M50 steel and M50NiL steel having surface hardnesses above 60 HRC, and in the range of 65–72 HRC. The hardness in the surface region is achieved by nitriding the surface. This steel has a high hardness and achieves extended life. The life improvements can be up to about ten times over that of a non-nitrided bearing. The useful temperature range will be similar to that of the current alloys. This improvement is brought about by controlling the microstructure of the alloy. First, a martensitic structure is formed, and retained austenite is minimized or totally eliminated. The material will be tempered as required.

The surface is then nitrided, but the nitriding operation is carefully controlled to avoid the formation of intergranular nitrides. Because of the method used to prevent the formation of intergranular nitrides, some carbon may be present during the nitriding operation to prevent the surface of the steel from becoming depleted of carbon. The nitriding operation may thus be termed nitro-carburizing, as carbon may be included in order to maintain the concentration of carbon at the surface. The hardening element in this nitro-carburizing operation is nitrogen, which forms iron nitride as $Fe_3N$ or $Fe_4N$ intragranularly. The purpose of the carbon in the operation is not to alter the concentration of carbon in the surface of the bearing, but only to prevent denuding the surface of carbon by maintaining the concentration of carbon in the surface of the bearing, so that the properties are not altered by decarburizing the surface while preventing the decoration of the grain boundaries with intergranular nitrides. Standard gaseous and plasma nitriding techniques may be used as well.

The M50 and M50NiL bearings of the present invention having nitrided surfaces which are not over-saturated in nitrogen and which substantially avoid the formation of intergranular nitrides. The nitrogen level in the surface region, or case-hardened region is maintained below 2.35%, and the case depth is about 0.002–0.014 inches, although deeper case depths can be achieved if desired.

The surfaces nitrided in accordance with the present invention include inner bearing races, outer bearing races and roller elements. While the entire bearing may be case-hardened by the nitriding process, the case-hardening treatment may be restricted to selected areas of the bearing by masking those areas where case-hardening is not desired or where it may be detrimental.

An advantage of the present invention is that M50 and M50NiL bearings can be provided having a case-hardened surface producing hardnesses in excess of 60 HRC. Even though the bearing surface achieves a high level of hardness, the surface is not prone to failure by spallation or fast spall propagation, as the nitriding process utilized avoids the formation of intergranular nitrides while forming intragranular nitrides. As used herein, intragranular nitrides includes $Fe_3N$, $Fe_4N$ and complexes of these particles that may include various alloying elements such as vanadium, chromium, molybdenum etc., uniformly distributed within the grains and not concentrated at grain boundaries.

Another advantage of the present invention is that a M50 or M50NiL bearing having the microstructure of the present invention can achieve an extended life over current M50 or M50NiL bearings, or alternatively, can be used with higher loads.

Another advantage of the present invention is that the bearings of the present invention avoid the detrimental intergranular precipitates that form during case-hardening operations that may shorten the life of the bearings.

The present invention allows the continued use of the familiar and inexpensive M50 and M50NiL, when processed properly to provide a microstructure that avoids the formation of intergranular precipitates, for more demanding bearing applications.

Other features and advantages of the present invention will be apparent from the following more detailed description of the preferred embodiments, taken in conjunction with the accompanying drawings which illustrate, by way of example, the principles of the invention.

DETAILED DESCRIPTION OF THE INVENTION

Figure 1:
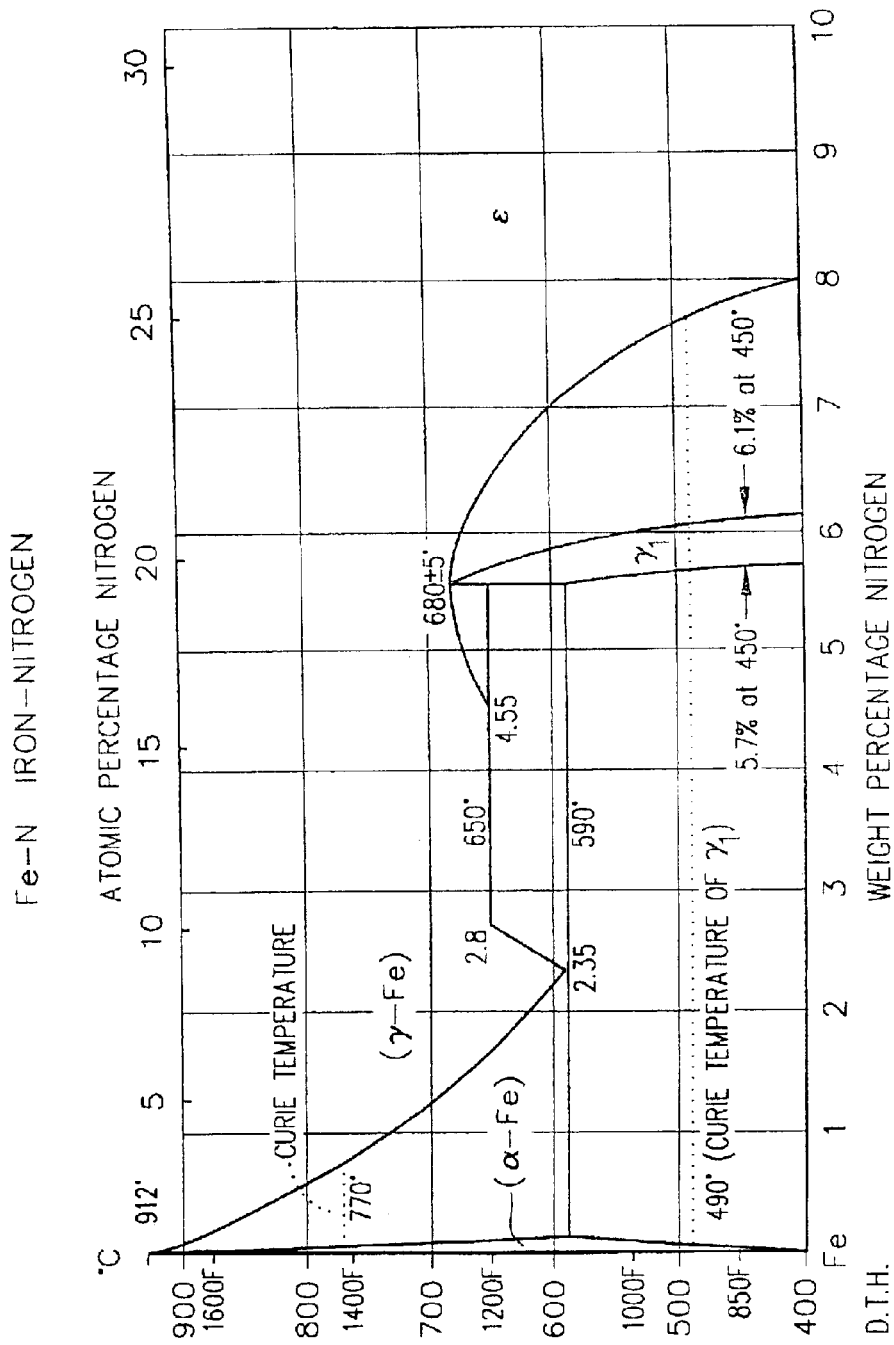
FIG. 1 is a phase diagram of the iron-nitrogen system.

The present invention utilizes a bearing made from M50 steel or M50NiL steel and case-hardened to a depth of about 0.002–0.014 inches (2 to 14 mils). Case-hardening is achieved by a nitriding treatment which avoids the formation of intergranular precipitates. The nitriding treatment should also not result in the decarburization of the surface of the steel. The bearing is comprised of an inner race, an outer race and roller elements. At least one of these elements should be comprised of the nitrided M50 or M50NiL steel of the present invention. And while the entire elements may be nitrided, portions of the bearing surfaces may be masked, if desired so as not to be nitrided. As a minimum, however, the wear surfaces, which include the roller elements, and the raceway surfaces of the inner race and the outer race as well as the lands of the raceways are nitrided. The bearing may include a roller cage or retainer for retaining the roller elements, which may be comprised of any suitable material.

The tool steel referred to as M50 used as a bearing material for aircraft engine applications is comprised of, in weight percent, about 0.80–0.85% carbon, about 4.00–4.25% chromium, about 4.00–4.50% molybdenum, about 0.15–0.35% manganese, about 0.10–0.25% silicon, about 0.9–1.10% vanadium, 0.015% max. phosphorus, 0.010% max. sulfur, 0.15 max. nickel, 0.25% max. cobalt, 0.25% max. tungsten, 0.10 max. copper and the balance essentially iron. As used herein, the term "balance essentially iron" or "balance of the alloy essentially iron and incidental impurities" is used to include, in addition to iron, small amounts of impurities and other incidental elements, some of which have been described above, that are inherent in steels, which in character and/or amount do not affect the advantageous aspects of the alloy.

The tool steel referred to as M50NiL is a low carbon, high nickel variant of the M50 alloy. M50NiL, also used as a bearing material for aircraft engine applications, is comprised of, in weight percent, about 0.11–0.15% carbon, about 4.00–4.25% chromium, about 4.00–4.50% molybdenum, about 0.15–0.35% manganese, about 0.10–0.25% silicon, about 3.20–3.60% nickel, about 1.13–1.33% vanadium, 0.015% max. phosphorus, 0.010% max. sulfur, 0.25% max cobalt, 0.25% max. tungsten, 0.10 max. copper and the balance essentially iron.

These tool steels achieve their beneficial properties as martensitic steels. As bearing materials, its beneficial properties are achieved by forming martensite and avoiding retained austenite. Retained austenite is soft and adversely affects the properties of the M50 or M50NiL as a bearing material and is to be minimized, and if practical avoided entirely. The retained austenite can be minimized by techniques well known in the art such as rapid and severe quenches in suitable quench media, such as for example, an oil quench. If necessary, a cryogenic quench may be utilized to avoid the retained austenite. By a rapid quench, the nose of the TTT curve can be avoided and the transformation to martensite can be complete. If a rapid quench does not sufficiently minimize retained austenite, the retained austenite can be reduced from the steel by a series of heat treatments at temperatures well below the γ transition temperature. Multiple ages at temperatures in the range of 1000° F. will promote the formation of carbide precipitates in any retained austenite. Because carbon is an austenite (γ) stabilizer, the formation of these precipitates decreases the concentration of carbon in the austenite and promotes the conversion of austenite to a ferrite+graphite structure such as martensite.

However, as has been noted by the prior art, the quenched and tempered form of M50 and M50NiL still lacks sufficient hardness to serve as an effective bearing material for long periods of time at high loads and high temperatures. It is necessary to harden the material. Hardening has been accomplished in the past by carburizing, nitriding or carbonitriding the steel. And while these prior art methods have produced hardened surfaces, these hardened surfaces have failed under load as portions of the surface have spalled. The prior art methods of hardening have caused the formation of intergranular precipitates, which has promoted the formation of a weak γ' phase. This has been particularly true for nitriding processes, which will be discussed in detail.

The prior art processes for nitriding have oversaturated the surface of the steel with nitrogen at elevated temperatures. Nitriding and carbonitriding typically have been accomplished at elevated temperatures in the range of 850–1050° F. for nitriding, and 1650–1850° F. for carbonitriding for short periods of time. Both carbon and nitrogen are austenite (γ) stabilizers and these temperatures are above the γ-transition temperature, even though for only short periods of time. The nitriding and carbonitriding have been accomplished in atmospheres in which there has been a local oversaturation of the surface with nitrogen. The surface of the M50 or M50NiL material is exposed to an excess of nitrogen, which increases the nitrogen concentration at the surface faster than the nitrogen can diffuse inward and away from the surface even at elevated temperatures.

Figure 2:
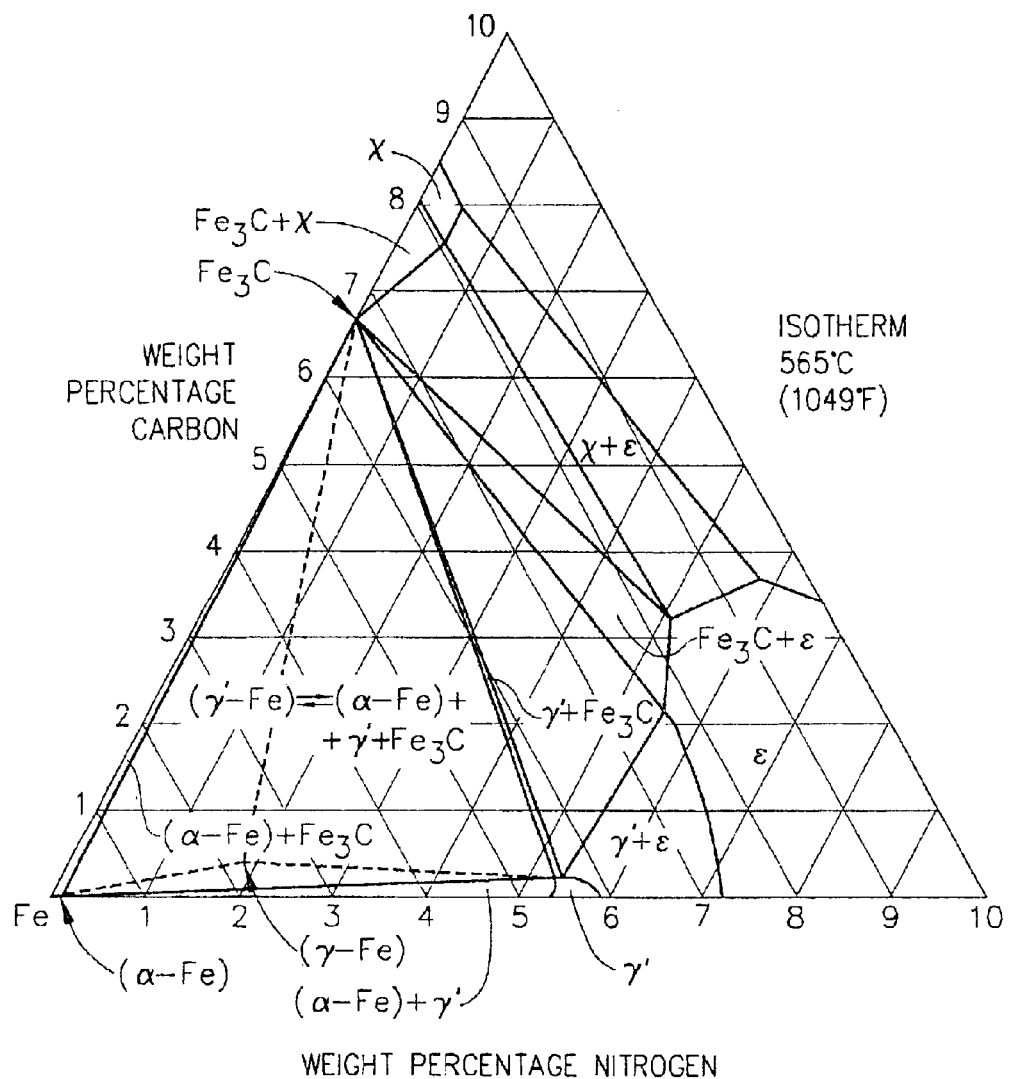
FIG. 2 is a ternary phase diagram of the iron-carbon-nitrogen (Fe—C—N) system at an isotherm of 1049° F.
Figure 3:
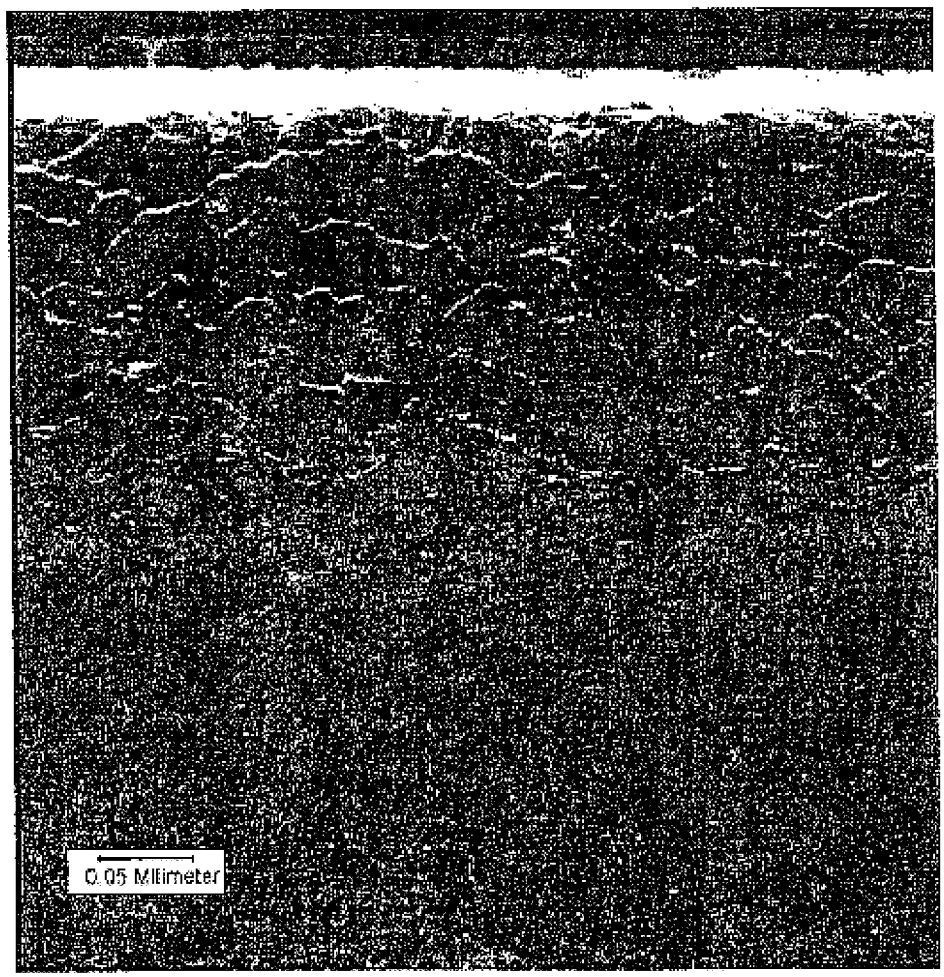
FIG. 3 is a photomicrograph of a specimen nitrided using conventional nitriding procedures, depicting the presence of intergranular γ'.

Reference is now made to FIG. 1, a phase diagram of the iron-nitrogen system that provides an indication of the phase transformations that occur in a steel such as M50 under such conditions. The eutectoid transition of γ-iron in this system occurs at about 1200° F. and about 2.35% nitrogen. Thus, as the surface of the steel becomes oversaturated with the interstitial nitrogen at elevated temperatures, a hypereutectoid nitride phase becomes stable, and this phase undesirably precipitates along the grain boundaries as a gamma prime (γ'). The prior art nitriding processes subject the surfaces of the M50 and M50NiL bearings to concentrations of nitrogen well in excess of 2.35% nitrogen at temperatures in the range of 800–1000° F. Thus, conditions are favorable for formation of the undesirable intergranular white phase, which is γ', or above about 5.5% by weight nitrogen, a combination of γ' and ε-nitride. M50 and M50NiL steels in which this γ' form fail prematurely under loads by spalling. Thus, the benefits of the hardness achieved by conventional nitriding are short-lived, as the resulting microstructure displays a decoration of the grain boundaries with hypereutectoid γ'. Referring now to FIG. 3, which is an isotherm of the ternary carbon-iron-nitrogen diagram at 1049° F., the effect of increasing N content at the carbon content of M50 on phase formation can be seen. The instability of the α-Fe phase increases with increasing N as the eutectoid is approached. The same effect occurs for M50NiL, although a slightly higher nitrogen concentration is required due to its lower C content as can be seen in FIG. 2.

EXAMPLE 1

Figure 4:
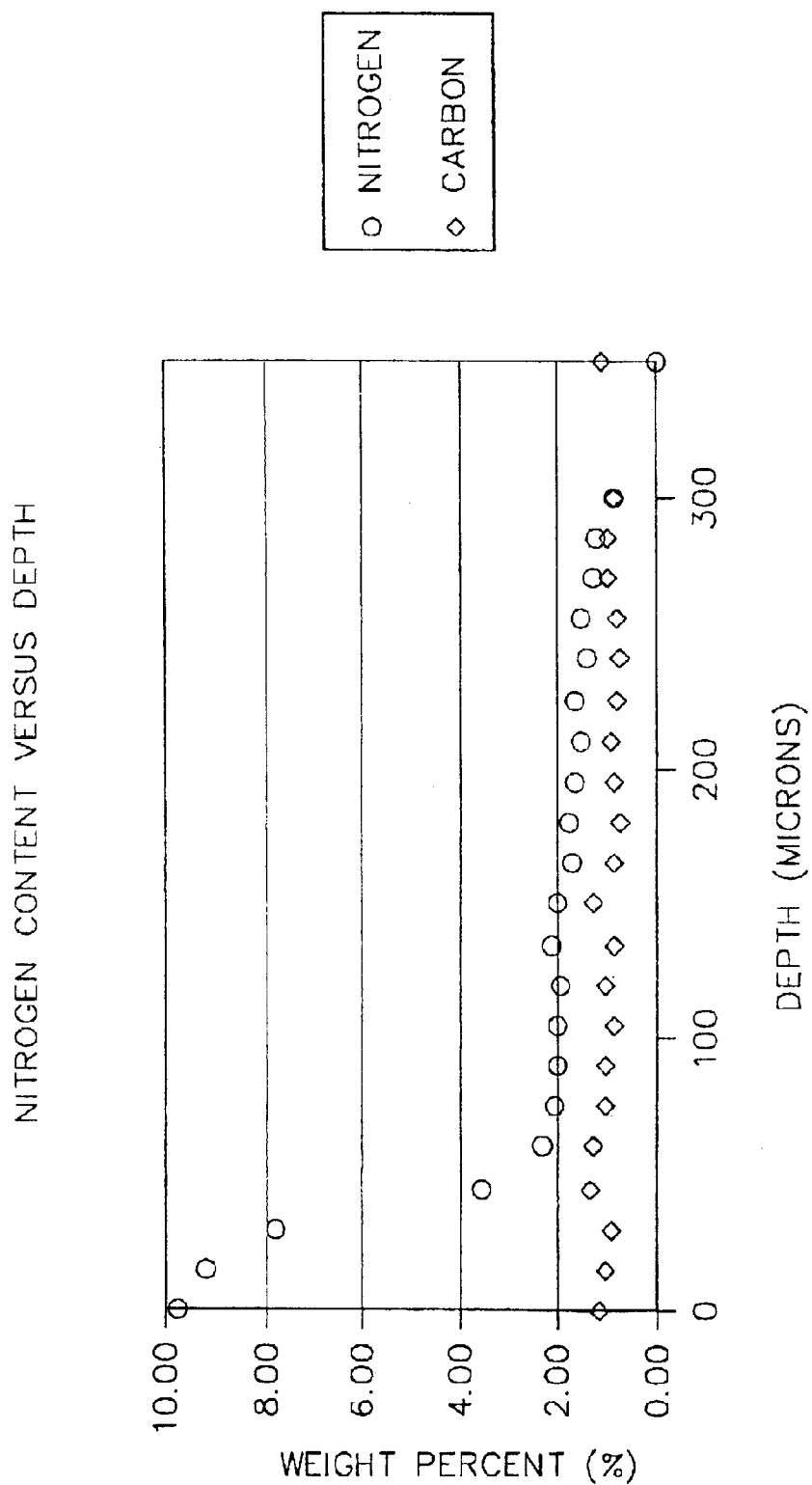
FIG. 4 is a microprobe profile of the specimen of FIG. 3, showing the concentration of nitrogen in the near surface region.

An M50NiL specimen was nitrided in accordance with prior art practices as discussed above. The specimen was subjected to a nitrogen atmosphere sufficient to permit nitrogen diffusion into the exposed surfaces of the specimen at a temperature in the range of 800–1100° F. up to 80 hours. The nitriding successfully case-hardened the specimen, producing a surface hardness of about 70 HRC. The specimen was sectioned. A photomicrograph of the sectioned specimen is shown in FIG. 3. The intergranular nitrides are clearly visible as a white phase at the surface and immediately below the surface of the specimen. A microprobe of the specimen is provided in FIG. 4. This microprobe discloses a nitrogen content of about 10% by weight at the surface of the specimen, which drops to about 2% by weight at a depth of about 50–150 microns, and then drops below 2% at a depth greater than about 150 microns. This high nitrogen content at and below the surface corresponds to the formation of the white phase at and below the surface as shown in FIG. 3. Bearings nitrided in accordance with the prior art process applied to the specimen have failed, as has been reported, by spallation of the bearing contact areas.

The present invention provides a bearing comprised of a M50 or M50NiL material that has been nitrided to avoid the formation of the undesirable white phase or intergranular phase. In the bearing areas, which can include the inner race, the outer race, raceway lands and rolling elements, complex intragranular iron nitride particles as $Fe_3N$ or $Fe_4N$ or combinations thereof form while the formation of a precipitate of the undesirable white phase γ' or ε-nitride is avoided. The complex iron nitride complexes include chromium, molybdenum, and vanadium, although their exact chemical composition is not important to the operation of this invention. The bearings nitrided so as to avoid the formation of the white phase have excellent hardness values in the range of 64–72 HRC, and most preferably in the range of 66–70 HRC. The hardness values rapidly decrease below the surface. Depending upon the treatment used, the hardness below the surface can vary. At a depth of 0.012 inches, the hardness value may still be as high as 62 HRC. However, the hardness values decrease with increasing distance from the surface, where the base material hardness of no greater than about 62 HRC is reached.

The formation of the iron nitride while avoiding the formation of the intergranular white phase, in particular the formation of γ', is achieved by nitriding the M50 or the M50NiL at relatively low temperatures. The nitriding is carried out only after processing has been accomplished to remove retained austenite, γ phase, to the maximum extent possible. The M50 or M50NiL bearing, which is substantially in the final machined condition except for minor machining and grinding operations, is subjected to a nitriding operation in the relatively low temperature range of about 800–1000° F. Slightly higher or lower temperatures may be used as long as the transition temperature of martensite (or ferrite) to austenite is avoided. The nitriding is done at this low temperature and under a partial pressure of nitrogen so as to prevent oversaturation of the surface with nitrogen.

The surface and near surface nitrogen composition is carefully maintained at all times in the hypoeutectoid region, yet the nitriding is performed to establish a suitable case depth to achieve the required hardness for successful bearing operation. This is accomplished by performing the nitriding operation within the identified temperature operation for a relatively long period of time, at least about 25 hours. The austenite transition is avoided by the low nitriding temperatures, but the partial pressure of nitrogen is sufficiently low so as to allow a slow rate of absorption into the bearing so that the surface does not have a locally high concentration of nitrogen, so that the eutectoid composition and hypereutectoid compositions are also avoided. The partial pressure of nitrogen is adjusted to balance the absorption of the nitrogen with the diffusion of interstitial nitrogen below the surface. If the rate of absorption nitrogen is greater than the rate of diffusion, the concentration of nitrogen can undesirably be raised at the surface and near surface region. Ideally, the nitrogen concentration at the surface and near surface during the nitriding is maintained below the eutectoid value of 2.35% by weight, preferably less than about 1.80% by weight at all times.

The bearing of the present invention made from M50 steel or M50NiL steel provides a nitrided, case-hardened surface region having a surface hardness in the range of 62–72 HRC, preferably about 64–70 HRC and most preferably about 66–68 HRC. The case-hardened region is characterized by a lack of intergranular γ' and ε-nitride, while the bearing is substantially free of retained austenite. The case-hardened structure is achieved by a low temperature nitride treatment using a partial pressure of nitrogen. The partial pressure used will depend on the temperature and the balance between nitrogen absorption at the surface from the partial pressure atmosphere and the diffusion mechanism of nitrogen away the surface, the diffusion away from the surface being sufficient to prevent a build-up at the surface below the eutectoid nitrogen concentration, and preferably at about 2% by weight. The depth of the case-hardened layer is dependent on the length of time of the nitriding operation. Typically, a bearing wear surface will require case-hardening to a depth of about 0.006–0.014". Final grinding operations will require removal of about 0.002" of material to yield a finished bearing having a case-hardened thickness of about 0.004–0.012". The minimum time required for nitriding in the temperature range of 800–1000° F. to achieve an acceptable case depth is about 25 hours, while nitriding at longer times, up to 100 hours or longer, is required to achieve a case depth of 0.014".

As noted, the nitriding operation is achieved by using a partial pressure of nitrogen. This can be achieved by any convenient method, including for example dissociation of ammonia gas or supply of nitrogen gas. The desired partial pressure is controlled by using a gas that does not adversely react with nitrogen, such as for example, hydrogen or an inert gas, such as argon. It will be understood that the nitriding operation may undesirably affect the carbon concentration of the surface which is being nitrided. If it is determined that the nitriding atmosphere is causing the surface of the bearing to become depleted of carbon, the atmosphere may be adjusted to include carbon. As used herein, such a process is a derivative of the nitriding operation and is referred to as ferritic nitro-carburizing. It is not to be confused or used interchangeably with carbonitriding. The purpose of the ferritic nitro-carburizing operation is to prevent the surface undergoing a nitriding operation below the austenitic transition temperature from becoming depleted of carbon while the nitrogen concentration is increased, as such a depletion can adversely affect the hardenability of the surface. This differs from the concept of carbonitriding, in which the surface concentration of both carbon and nitrogen is increased at temperatures well into the austenitic range. The ferritic nitro-carburizing operation utilized to achieve the case-hardened surface in the present invention maintains the nitrogen concentration at the surface of the bearing at no greater than about 2.35% by weight, and preferably at or below about 2% by weight while preventing the grain boundaries from being decorated with nitrides.

EXAMPLE 2

Figure 5:
FIG. 5 is a photomicrograph of a specimen nitrided in accordance with the present invention.
Figure 6:
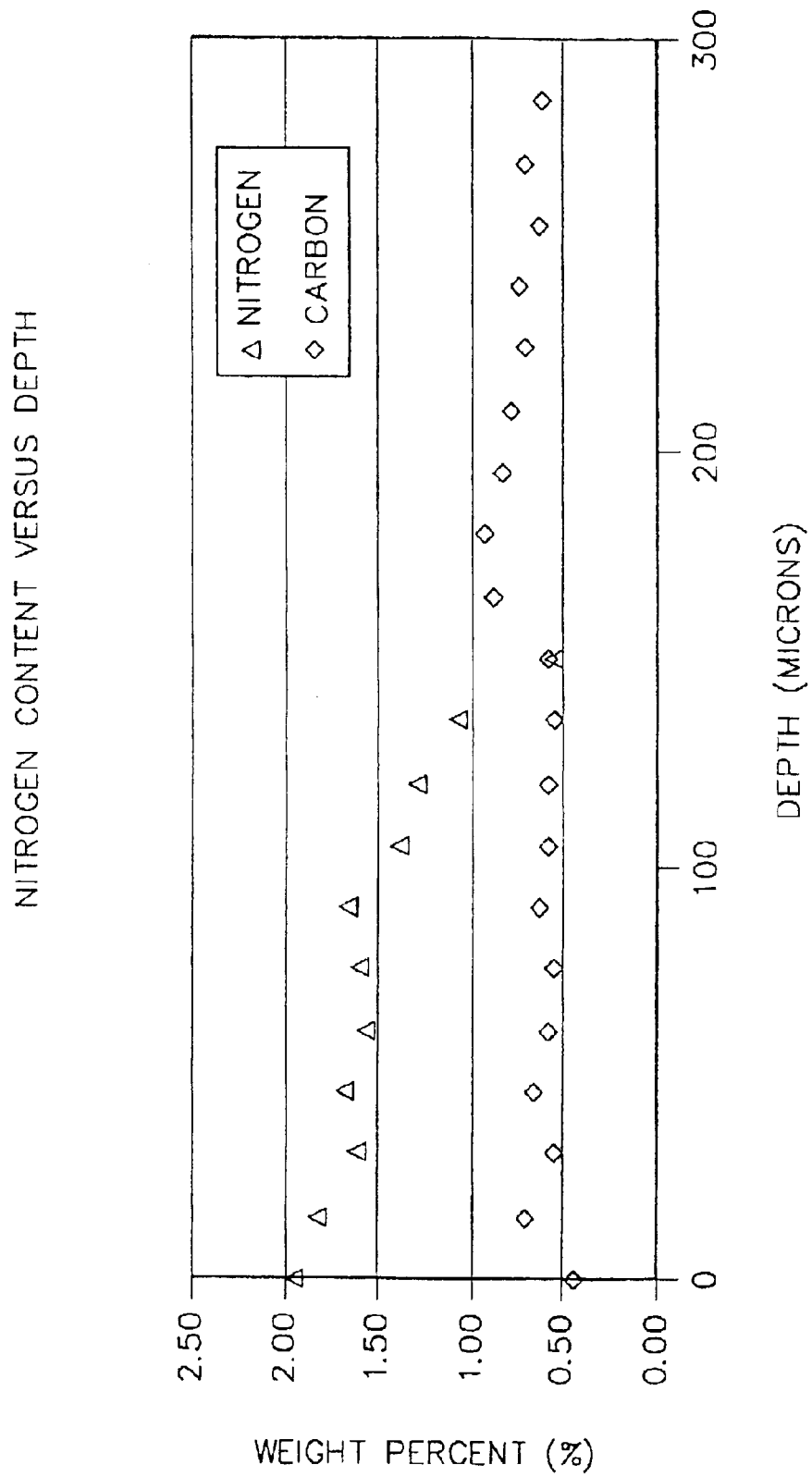
FIG. 6 is a microprobe profile of the specimen of FIG. 5, showing the concentration of nitrogen in the near surface region.
Figure 7:
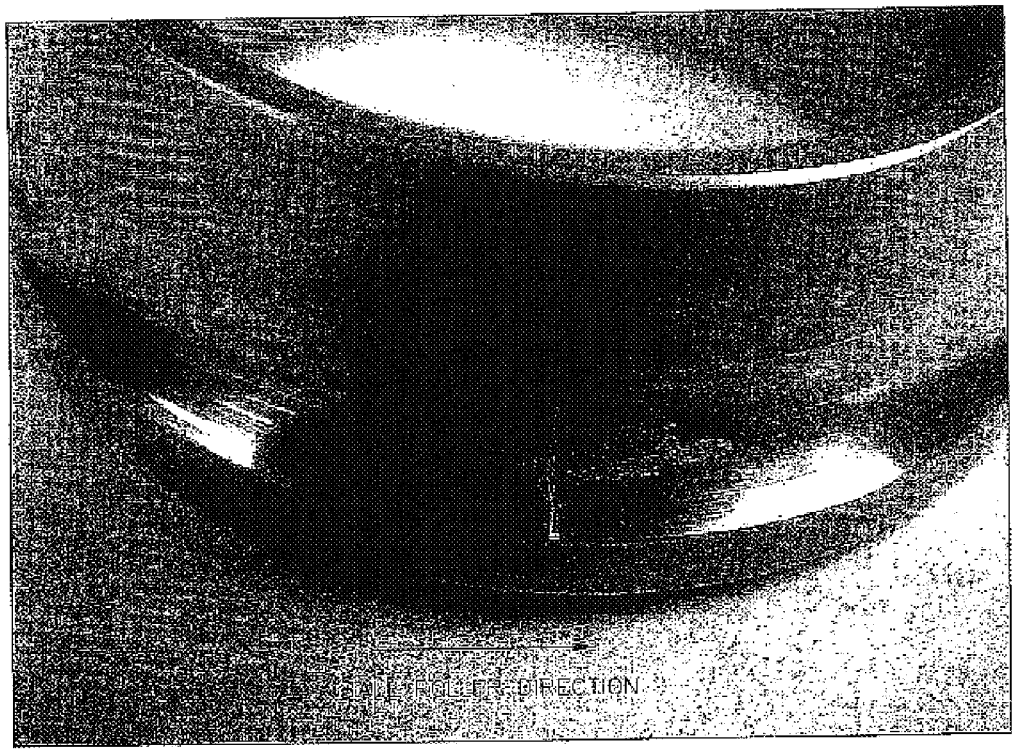
FIG. 7 is a photograph of a bearing nitrided in accordance with the present invention and tested for 56 hours.

An M50NiL specimen was nitrided in accordance with the present invention as discussed above. The specimen was subjected to a partial pressure of nitrogen at a nominal temperature of 900° F. to achieve a case depth of about 300 microns (about 12 mils). The nitriding successfully case-hardened the specimen, producing a surface hardness of about 70 HRC. The specimen was sectioned. A photomicrograph of the sectioned specimen is shown in FIG. 5. The photomicrograph indicates that the specimen is substantially free of intergranular nitrides at the surface and in the near-surface region. A microprobe of the specimen is provided in FIG. 6. This microprobe discloses a nitrogen content of about 2% by weight at the surface of the specimen, which drops gradually to about 1% by weight at a depth of about 200 microns, and then drops gradually to about 0.5% at a depth of about 300 microns. This nitrogen content is sufficiently high to provide a case-hardened surface, but not so high as to promote the formation of the white phase in this region. A bearing nitrided in accordance with the process of the present invention was tested for 56 hours using tests developed to measure spallation. The tested bearing did experience some localized spallation. However, unlike M50NiL bearings nitrided in accordance with the prior art, this spallation did not propagate. FIG. 7 is a photograph that shows this bearing after 56 hours of tests. This test demonstrates the good performance (slow spall propagation rate) of a bearing which was sufficiently low in intergranular nitrides.

The present invention achieves a hardened bearing material by case-hardening M-50 and M50NiL by nitro-carburizing, that is, nitriding with some carburizing in the temperature range of 800–1000° F. This nitro-carburizing differs from carbonitriding which is performed at elevated temperatures in the range of 1600–1800° F. The process is performed on a martensitic steel at a low temperature, below the transformation temperature. The low temperature process is required to avoid the deposition at the grain boundaries of the white phase, that is, gamma prime or epsilon nitride which is formed by oversaturation with N. The low temperature process also permits excellent depth control of the nitrided case and carburized case. The temperature is below the transition temperature to avoid the formation of austenite, because C and N are austenite stabilizers, which would then impede a subsequent transformation from austenite to martensite. The formation of gamma prime or epsilon nitride would also promote diffusion along the grain boundaries and the undesirable formation of intergranular nitrides and carbides. The low temperature treatment that avoids the formation of these phases promotes intragranular diffusion and a slower diffusion rate.

Some carbon typically is present in these alloys of M50 and M50NiL, typically about 0.75% nominal. However, if the nitriding operation causes a decarburization of the surface, a carburizing operation can be performed to restore a carburized surface.

The nitro-carburizing treatment of the present invention is suitable for inner races, rolling elements, outer races and lands of the raceways. Areas that do not require the treatment or which must be protected from the treatment may be masked or provided with excess stock, which can be subsequently ground off.

The process is directed to avoiding the formation of retained austenite. If necessary, multiple ages of the martensitic steel at about 1000° F. to avoid austenite may be performed. These multiple low temperature treatments forms carbide precipitates. If necessary cryogenic quench treatments may be performed on the steel to transform any austenite to martensite.

The controlled nitriding process of the present invention avoids the eutectoid point in phase diagram, thereby avoiding the formation of gamma iron at temperatures as low as 1049° F. As the N content of the alloy increases, then grain boundaries begin to be decorated with nitrides in the hypereutectoid alloy, which is undesirable. A nitriding operation that prevents oversaturation of the alloy with hypereutectic nitride avoids the formation of the white or compound layer at the grain boundaries. The white layer is $Fe_3N$ or $Fe_4N$ formed when there is a high nitrogen content. At lower temperatures, the reaction kinetics provides slower diffusion and slower absorption of the nitrogen. Thus, at temperatures of 800–1000° F., the hypocutectic nitrides are formed intragranularly and are distributed relatively uniformly in the surface or near surface region. At these relatively low temperatures, there is balance between absorption and diffusion, so that the concentration of N near the surface of the alloy does not become sufficiently high so that this region becomes hypereutectic. Even at these low temperatures, a hypereutectic region can be achieved with a sufficiently long treatment time. Typically a 25 hour minimum treatment achieves 0.006 mils depth of hardened surface, which includes an allowance of 0.002 mils for grinding. 100 hrs provides about 12 mils with about 0.002 mils allowance for grinding. While the surface is hardness greater than 64 HRC, it quickly falls off to 62 HRC a short distance below the surface. The surface is resistant to contamination and displays compressive residual stresses typically associated with standard high temperature nitriding operations.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A bearing material comprising:
   a martensitic steel having a surface region with a hardness in the range of about 64–72 HRC, the surface region being case-hardened to a case depth of 0.002" to about 0.014", the surface region having a nitrogen content of up to about 2.35% by weight;
   the surface region characterized by the formation of intragranular iron nitride particles and a substantial absence of an intergranular white phase, and the martensitic steel characterized by a substantial absence of retained austenite.

2. The bearing material of claim 1 wherein the martensitic steel is M50 comprising, in weight percent, about 0.80–0.85% carbon, about 4.00–4.25% chromium, about 4.00–4.50% molybdenum, about 0.15–0.35% manganese, about 0.10–0.25% silicon, about 0.9–1.10% vanadium, 0.015% max. phosphorus, 0.010% max. sulfur, 0.15 max. nickel, 0.25% max. cobalt, 0.25% max. tungsten, 0.10 max. copper and the balance essentially iron and incidental impurities.

3. The bearing material of claim 1 wherein the martensitic steel is M50NiL comprising, in weight percent, about 0.11–0.15% carbon, about 4.00–4.25% chromium, about 4.00–4.50% molybdenum, about 0.15–0.35% manganese, about 0.10–0.25% silicon, about 3.20–3.60% nickel, about 1.13–1.33% vanadium, 0.015% max. phosphorus, 0.010% max. sulfur, 0.25% max cobalt, 0.25% max. tungsten, 0.10 max. copper and the balance essentially iron and incidental impurities.

4. The bearing material of claim 1 wherein the intergranular white phase comprises a precipitate selected from the group consisting of gamma prime, $\epsilon$-nitride and combinations thereof.

5. The bearing material of claim 1 wherein the case-hardened surface region has a hardness in the range of 66–70 HRC.

6. The bearing material of claim 5 wherein the steel below the case-hardened surface region has a hardness of no greater than 59 HRC.

7. The bearing material of claim 1 wherein the case-hardened surface region has a nitrogen content of no greater than about 2% by weight.

8. The bearing material of claim 7 wherein the case-hardened surface region has a nitrogen content of up to about 1.8% by weight.

9. The bearing material of claim 1 wherein the surface region is case-hardened to a case depth of about 0.006" to about 0.014".

10. The bearing material of claim 1 wherein the surface region of the bearing has a case depth of about 0.004" to about 0.012".

11. The bearing material of claim 1 wherein the wherein the material is used as at least one bearing element selected from the group consisting of an inner race, an outer race and roller elements.

12. A method of manufacturing a bearing element from a martensitic steel, the bearing element characterized by a surface region with a hardness in the range of about 64–72 HRC, the surface region being case-hardened to a preselected depth, the surface region characterized by the formation of intragranular iron nitride particles and a substantial absence of an intergranular white phase, comprising the steps of:
   providing a martensitic steel composition;
   treating the martensitic steel composition to provide a microstructure substantially free of retained austenite; then
   nitriding the martensitic steel composition in a partial pressure of nitrogen at a temperature in the range of 800–1000° F. for a preselected time to achieve a hardness in the range of 64–72 HRC to a preselected depth while obtaining a nitrogen content of up to about 2.35% by weight within the preselected depth.

13. The method of claim 12 wherein the step of treating the martensitic steel composition to provide a microstructure substantially free of retained austenite further includes the additional steps of:
   heating the martensitic steel composition to a temperature sufficient to form a structure completely of austenite;
   rapidly quenching the austenite in a quench medium so as to avoid the nose of the TTT curve, thereby completely transforming the austenite to martensite.

14. The method of claim 13 wherein the step of rapidly quenching is accomplished by a cryogenic quench.

15. The method of claim 13 wherein the step of rapidly quenching is accomplished by an oil quench.

16. The method of claim 12 wherein the step of treating the martensitic steel composition to provide a microstructure substantially free of retained austenite further includes the additional steps of multiple aging of the martensitic steel composition in the temperature range of 1000° F. to promote the formation of carbide precipitates to promote the transformation of austenite to a ferrite+graphite structure.

17. The method of claim 12 wherein the step of nitriding the martensitic steel composition includes nitriding to achieve a preselected depth in the range of about 0.002" to about 0.014".

18. The method of claim 12 wherein the step of nitriding the martensitic steel composition includes nitriding for a preselected time of at least about 25 hours.

19. The method of claim 12 wherein the martensitic steel composition is selected from the group of alloys consisting of M50 and M50NiL.

20. The method of claim 19 further including the additional step of carburizing the martensitic steel composition in the temperature range of about 800° F. to about 1000° F. to prevent the decarburization of the surface region of the martensitic steel during the nitriding step, so as to maintain the carbon content of the martensitic composition within the composition of the alloy.

21. The method of claim 12 further including the additional step of grinding the case-hardened surface region to a preselected depth to remove a portion of the surface.

22. The method of claim 21 wherein the preselected depth is about 0.002".

23. The method of claim 12 wherein the step of nitriding achieves a nitrogen content of up to about 2%.

24. The method of claim 19 wherein M50NiL composition is nitrided at a temperature of about 900° F. to a preselected depth of about 14 mils to achieve a surface hardness of about 70 HRC, the surface region of the M50NiL composition characterized by a nitrogen content of about 2% by weight at a surface, about 1% nitrogen content at about 8 mils below the surface and about 0.5% nitrogen content at about 14 mils below the surface.

25. The method of claim 24 wherein M50NiL composition is nitrided at a temperature of about 900° F. to a preselected depth of about 6–10 mils to achieve a surface hardness of about 70 HRC, the surface region of the M50NiL composition characterized by a nitrogen content of about 2% by weight at a surface, about 1% nitrogen content at about 6 mils below the surface and about 0.5% nitrogen content at about 10 mils below the surface.

* * * * *

UNITED STATES PATENT AND TRADEMARK OFFICE
CERTIFICATE OF CORRECTION

PATENT NO. : 6,966,954 B2
DATED : November 22, 2005
INVENTOR(S) : Rhoads et al.

It is certified that error appears in the above-identified patent and that said Letters Patent is hereby corrected as shown below:

Title page,
Item [56], References Cited, U.S. PATENT DOCUMENTS, "5,873,056" should be -- 5,873,956 --.

Column 1,
Line 10, "N00421-00-R0023S" should be -- N00421-00-R-0235 --.

Column 4,
Line 22, "0.15 max" should be -- 0.15% max --.
Lines 23 and 39-40, "0.10 max" should be -- 0.10% max --.

Column 9,
Line 51, "0.15 max" should be -- 0.15% max --.
Lines 52 and 61-62, "0.10 max" should be -- 0.10% max --.

Signed and Sealed this

Fourteenth Day of March, 2006

JON W. DUDAS
*Director of the United States Patent and Trademark Office*